Dec. 9, 1969 G. E. FENNER 3,483,529

LASER LOGIC AND STORAGE ELEMENT

Filed Oct. 14, 1966

Inventor:
Gunther E. Fenner,
by Marvin Snyder
His Attorney.

3,483,529
Patented Dec. 9, 1969

3,483,529

LASER LOGIC AND STORAGE ELEMENT

Gunther E. Fenner, Schenectady, N.Y., assignor to General Electric Company, a corporation of New York Filed Oct. 14, 1966, Ser. No. 586,686
Int. Cl. G11b 9/00
U.S. Cl. 340—173 10 Claims

ABSTRACT OF THE DISCLOSURE

An apparatus for the storage and retrieval of data is disclosed in which a semiconductor junction laser is pulsed with a relatively long first current pulse having an amplitude below the original threshold of lasing and upon termination of said long first current pulse, the laser is interrogated by a shorter second current pulse of amplitude below the original threshold amplitude required for lasing but at least equal to the decreased threshold amplitude, whereupon an output is obtained from a detector, responsive to the condition of the laser, for indicating the data stored by the laser.

This invention relates to logic elements, and more particularly to use of a semiconductor junction laser as a memory element capable of being interrogated and nondestructively read out.

Memory elements of diverse varieties have long been used in logic systems. Yet, self-contained optical memories for performing the storage function wholly internally have heretofore comprised passive elements in general. The present invention, however, utilizes a semiconductor junction laser, also known as an injection laser, such as the type disclosed and claimed in R. N. Hall Patent No. 3,245,002, issued Apr. 5, 1966 and assigned to the instant assignee, as an active temporary storage element capable of being nondestructively read out.

To produce stimulated coherent emission from an injection laser, current supplied thereto must be of sufficient amplitude to exceed a threshold value, herein designated the threshold of lasing, below which coherent radiation does not occur. Existence of this threshold value, which represents the minimum current amplitude at any given time required to produce lasing at that time, is recognized in the aforementioned Hall patent.

It has been found that almost all semiconductor junction lasers fabricated by the diffusion process, such as the type described in the aforementioned Hall patent, exhibit a turn-on delay as the ambient temperature of the laser is increased to room temperature levels. This delay is believed to be due to optical absorption by the semiconductor material, which increases with temperature. Moreover, the delay is current dependent; that is, an increase in current tends to diminish the delay. At low temperatures, diminution of the delay with an increase in current is greater than at room temperatures. Although this delay has heretofore been considered to be an undesirable feature of semiconductor junction lasers, the instant invention utilizes this phenomenon for achieving data storage.

By applying a low amplitude current for a predetermined duration, the turn-on delay is decreased. It is believed that this decrease occurs because traps in the semiconductor material, which would otherwise absorb photons generated near the laser junction along the active region, are filled by the injected electrons. The absorption of photons effectively keeps stimulated emission from building up until most of the trapping centers have been filled, at which time an abrupt increase in current to a predetermined level below the orginal threshold of lasing, herein defined as the threshold extant prior to initiation of the low amplitude current, drives the laser into stimulated emission of radiation after essentially negligible delay.

The present invention concerns operation of an injection laser as a memory element by limiting, at all times, the amplitude of current supplied from the major source thereof, to less than the threshold value. This permits exploitation of the reduction in amplitude of additional current required to reach the threshold of lasing which, as pointed out above, occurs when a relatively small amplitude but long duration pulse is applied to the laser. Because the reduction in the threshold, moreover, persists for an appreciable length of time after termination of the below-threshold pulse when operating the laser at room temperature, the laser performs a binary storage function. Subsequent interrogation of the laser than results in an indication of the memory state of the laser.

Accordingly, one object of this invention is to provide a method of data storage and retrieval.

Another object of this invention is to provide an optical coincidence detector.

Another object is to provide a fast-acting temporary storage device compatible with nondestructive optical readout.

Another object is to provide an injection laser storage element wherein output data are emitted in the form of coherent light.

Briefly, in accordance with a preferred embodiment of the invention, apparatus is provided for storage and retrieval of data. This apparatus, which is capable of being nondestructively read out, comprises a semiconductor junction laser. Means are provided for selectively pulsing the laser with a relatively long first current pulse of amplitude below the original threshold of lasing, to decrease the threshold. Additional means are provided for pulsing the laser with a shorter second current pulse of amplitude below the original threshold amplitude required for lasing but at least equal to the decreased threshold amplitude. In addition, means responsive to the condition of the laser are provided for indicating the data stored by the laser.

In accordance with another preferred embodiment of the invention, a method for electronically storing and optically retrieving data is provided. This method comprises the steps of selectively pulsing an injection laser with a relatively long first current pulse to writer information therein, pulsing the laser with a shorter second current pulse to interrogate said laser, and detecting any radiation emitted from the injection laser upon occurrence of the second pulse.

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

Figure 1:
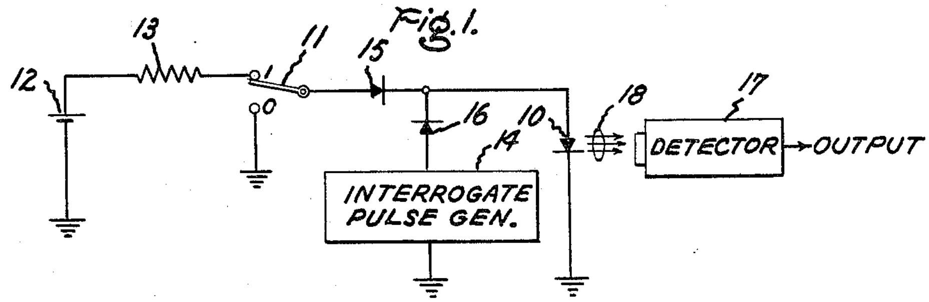
FIGURE 1 is a schematic diagram of apparatus embodying the invention.

FIGURE 1 illustrates a semiconductor junction laser 10 capable of being selectively pulsed by a switch 11, which may be any convenient form of electronic switching means, from a write source of current 12 through a current limiting resistance 13. An interrogate pulse generator 14 is also coupled to laser 10 for the purpose of pulsing the laser. A diode 15 is connected between switch 11 and laser 10 in order to prevent short circuiting by current source 12 of pulses produced by interrogate pulse generator 14, while a diode 16 is connected between interrogate pulse generator 14 and laser 10 in order to prevent short circuiting of current source 12 through interrogate pulse generator 14.

Coherent light 18 emitted by laser 10 impinges upon a detector 17. This detector preferably includes a photodetecting diode having very fast response. Thus, output of the detector, in the form of an electrical signal, comprises an electronic indication of emission by laser 10.

While semiconductor injection lasers applicable to the instant invention and fabricated by the diffusion process may be comprised of various direct transition semiconductor materials, a laser preferable for operation with the apparatus of FIGURE 1 is of the type comprised of gallium arsenide. Such lasers are completely described in the aforementioned Hall patent.

Interrogate pulse generator 14 produces pulses of duration in the order of 5 to 100 nanoseconds while pulses produced by switch 11 are preferably of a minimum duration which exceeds the duration of the interrogate pulse. The minimum duration of pulses produced by switch 11 increases as their amplitude decreases. In addition, current supplied by switch 11 is preferably smaller in amplitude than current supplied by interrogate pulse generator 14.

In operation, as long as switch 11 is in its "0" position, pulses produced by interrogate pulse generator 14 are of insufficient amplitude to drive laser 10 into stimulated emission; that is, the amplitude of these pulses is below the extant threshold of lasing. Under these conditions, detector 17 produces no output signal, since no radiation reaches the detector from laser 10.

When switch 11 is in the "1" position, write current is supplied from source 12 to laser 10 through resistance 13. This write current, in and of itself, is insufficient to achieve lasing; that is, the current amplitude is held well below the threshold of lasing at any time, so that detector 17 produces no output signal as a result of this current. However, while switch 11 is in the "1" position, each pulse produced by interrogate pulse generator 14 adds to the current from source 12 so as to exceed the extant threshold of lasing at that time. Hence, laser 10 is driven into stimulated emission, and detector 17 produces an output signal in response to the radiation emitted by the laser. Under these conditions, the radiation produced by laser 10 is in the form of pulses essentially in synchronism with the pulses produced by interrogate pulse generator 14, and the output signal produced by detector 10 is likewise essentially in synchronism with the pulses produced by pulse generator 14.

Figure 2:
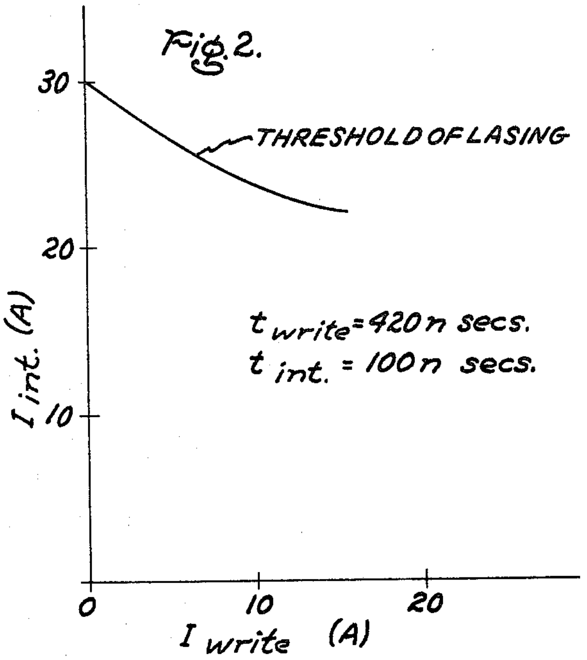
FIGURE 2 is a graphical illustration of the alteration in current required to achieve lasing under various conditions associated with the apparatus of FIGURE 1.

The amplitude of interrogate current $I_{int.}$ required to reach the threshold of lasing, for various levels of write current $I_{urite}$, is graphically illustrated in FIGURE 2 for a gallium arsenide laser having a 30-amp original threshold of lasing and being operated at a temperature at 300° K. with a write current pulse duration of 420 nanoseconds and an interrogate current pulse duration of 100 nanoseconds initiated immediately upon termination of the write current pulse. This figure depicts a decrease in interrogate current amplitude required to reach the threshold of lasing as write current amplitude increases, with the rate of decrease tapering off as write current increases. Therefore, since the fastest drop-off of interrogate current necessary to achieve threshold occurs when the write current is at a low value of amplitude, the memory element is preferably operated in this region, in order to minimize any possibility of a false signal being emitted from the laser. Moreover, the low value of write current thus utilized also serves advantageously to minimize heating of the laser.

Figure 3:
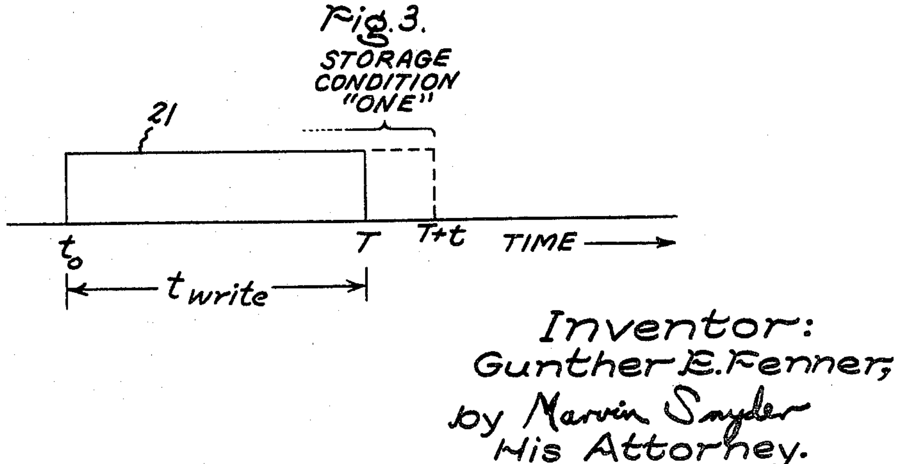
FIGURE 3 is a graphical illustration of conditions associated with the apparatus of FIGURE 1.

FIGURE 3 graphically illustrates operation of the laser as a temporary data storage device. The duration of the write pulse 21 extends from time of initiation $t_0$, when switch 11 of FIGURE 1 is moved to the "1" position, the time of completion T, occurring when switch 11 is returned to the "0" position. This pulse drives the laser from a storage condition designated ZERO, assuming switch 11 of FIGURE 1 was previously maintained in the "0" position for a sufficient length of time prior to time $t_0$, to a storage condition designated ONE, which occurs at a somewhat indeterminate time close to the end of the write pulse, depending upon size of the turn-on delay of the laser.

The time of occurrence of the ONE condition may be advanced or retarded by respectively increasing or decreasing amplitude of the write current pulse, provided this amplitude is maintained below the threshold of lasing. The significance of the ONE condition is that during its existence a short-duration interrogate pulse, itself being below the threshold amplitude, can be applied to drive the laser into stimulated emission. In this manner, the circuit of FIGURE 1 may be utilized as a coincidence detector, emitting radiation when the write and interrogate pulses are present concurrently, provided the laser is in the ONE condition. Moreover, even after completion of the write pulse at time T, there exists an interval between time T and time $(T+t)$ in which the laser remains in its ONE state. This interval is believed to be a result of the finite time required for the filled traps to empty. During this time, which may last for approximately 50–100 nanoseconds, an interrogate pulse of less than threshold value, applied to the laser, drives the laser into stimulated emission. Thus, storage of the ONE state is achieved from time T to time $(T+t)$. Moreover, because the influence of the interrogate pulse on the condition of the laser is quite small, the laser may be interrogated several times in rapid succession, such as within a period of a few times the length of a short interrogate pulse, and still not lead to an erroneous output indication. Hence, the circuit of FIGURE 1 provides nondestructive readout.

The foregoing describes a method and apparatus for achieving data storage and retrieval with a semiconductor junction laser. The data storage provided thereby is temporary, susceptible of rapid retrieval, and compatible with nondestructive readout. Output indications produced by the laser are supplied in the form of stimulated emission of radiation. The invention may also be utilized as a coincidence detector.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What is claimed is:

1. Apparatus for processing data comprising a semiconductor junction laser, means selectively pulsing said laser with a relatively long first current pulse of amplitude less than the original threshold of lasing to decrease the threshold, means interrogating said laser with a shorter second current pulse upon termination of said long current pulse, said second current pulse having an amplitude below the original threshold amplitude required for lasing but at least equal to the decreased threshold amplitude, and means responsive to the condition of said laser for indicating data stored by said laser.

2. The apparatus of claim 1 wherein said means responsive to the condition of said laser comprises photodetecting means positioned in the path of radiation emitted by said laser.

3. The apparatus of claim 1 wherein said means interrogating said laser with a shorter second current pulse produces a rapid succession of said shorter second current pulses, said second pulses being of amplitude below the original threshold amplitude required for lasing but each of said respective second pulses being at least equal to said decreased threshold amplitude.

4. The apparatus of claim 3 wherein said means responsive to the condition of said laser comprises photodetecting means positioned in the path of radiation emitted by said laser.

5. A method for electronically storing data and optically retrieving said data, said method comprising the steps of selective pulsing a semiconductor injection laser with a relatively long first current pulse to write information therein, pulsing said laser with a shorter second current pulse to interrogate said laser upon termination of said long first current pulse, and detecting any radiation produced by said laser upon occurrence of said second pulse.

6. The method of electronically storing and optically retrieving data of claim 5 wherein said laser is pulsed with a rapid succession of said shorter current pulses.

7. The method for electronically storing and optically retrieving data of claim 5 wherein said second pulse is of amplitude greater than said first pulse but less than the original threshold of lasing.

8. Apparatus for detecting a predetermined condition comprising a semiconductor junction laser, means selectively pulsing said laser with a relatively long first current pulse to decrease the original threshold of lasing, means pulsing said laser with a shorter second current pulse upon termination of said long first current pulse, said first and second pulses being individually below the threshold amplitude required for lasing at any given time but collectively at least equal to the threshold amplitude at a said given time, and means responsive to the condition of said laser for indicating occurrence of stimulated emission of radiation by said laser.

9. The apparatus of claim 8 wherein said means responsive to the condition of said laser comprises photodetecting means positioned in the path of said radiation.

10. The apparatus of claim 8 wherein said semiconductor junction laser is comprised of gallium arsenide.

References Cited

UNITED STATES PATENTS

| | | | |
|---|---|---|---|
| 3,200,259 | 8/1965 | Braunstein | 307—312 |
| 3,319,080 | 5/1967 | Cornely | 330—4.3 |

OTHER REFERENCES

IBM Technical Disclosure Bulletin, vol. 7, No. 6, p. 540, November 1964, "Bistable Laser Latch" by Dumke.

IBM Technical Disclosure Bulletin, vol. 6, No. 9, p. 86, February 1964, "Bistable Diode With Light Output" by Dumke et al.

TERRELL W. FEARS, Primary Examiner

U.S. Cl. X.R.

307—312; 330—4.3; 331—94.5